(12) United States Patent
Porcs

(10) Patent No.: US 10,183,602 B1
(45) Date of Patent: Jan. 22, 2019

(54) CUP HOLDER ASSEMBLIES HAVING LIGHTING FEATURES FOR CONSOLE ASSEMBLIES OF VEHICLES

(71) Applicant: Toyota Motor Engineering & Manufacturing North America, Inc., Erlanger, KY (US)

(72) Inventor: Robert A. Porcs, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 7 days.

(21) Appl. No.: 15/653,963

(22) Filed: Jul. 19, 2017

(51) Int. Cl.
*F21V 21/00* (2006.01)
*B60N 3/10* (2006.01)
*B60Q 3/64* (2017.01)

(52) U.S. Cl.
CPC ............... *B60N 3/101* (2013.01); *B60Q 3/64* (2017.02)

(58) Field of Classification Search
CPC ......... B60N 3/101; B60Q 3/64; B60Q 3/0203
See application file for complete search history.

(56) References Cited

U.S. PATENT DOCUMENTS

| | | | |
|---|---|---|---|
| 6,550,940 B2 | 4/2003 | Kamiya et al. | |
| 7,708,436 B2 | 5/2010 | Lota | |
| 8,162,520 B2 | 4/2012 | Penner | |
| 8,733,724 B2 | 5/2014 | Voigt et al. | |
| 2008/0266853 A1 | 10/2008 | Goto | |
| 2012/0118930 A1* | 5/2012 | Simon | B60N 3/106 224/545 |
| 2015/0175065 A1 | 6/2015 | Oh et al. | |
| 2016/0144779 A1 | 5/2016 | Inose et al. | |

FOREIGN PATENT DOCUMENTS

| | | |
|---|---|---|
| JP | 5445091 B2 | 3/2014 |
| KR | 100982971 B1 | 9/2010 |
| KR | 20120118930 A | 10/2012 |

* cited by examiner

*Primary Examiner* — Ali Alavi
(74) *Attorney, Agent, or Firm* — Dinsmore & Shohl LLP

(57) ABSTRACT

A cup holder assembly for a console assembly of a vehicle includes a cover, a housing, a light source, and a support frame. The cover includes an exterior surface, an opposite interior surface, and an opening extending between the exterior surface and the interior surface. The housing includes an open ended receptacle defined by a floor and at least one sidewall. The at least one sidewall includes a slit. The housing is connected to the interior surface of the cover such that the opening of the cover permits access to the open ended receptacle. The support frame is connected to at least one of the cover and the housing. The light source is mounted to the support frame such that the light source is positioned adjacent the slit in the at least one sidewall to illuminate an interior of the receptacle.

20 Claims, 7 Drawing Sheets

US 10,183,602 B1

CUP HOLDER ASSEMBLIES HAVING LIGHTING FEATURES FOR CONSOLE ASSEMBLIES OF VEHICLES

TECHNICAL FIELD

The present specification generally relates to cup holder assemblies for console assemblies of vehicles and, more specifically, to cup holder assemblies having lighting features.

BACKGROUND

Passenger compartments of vehicles may be equipped with console assemblies having cup holder assemblies located between a driver's seat and a front passenger's seat. The cup holders assemblies include cup holders configured to receive an object such as a cup or other beverage container.

Increasingly, vehicles are provided different interior packages. For example, interior packages for vehicles typically include lighting packages in which lighting features are provided within the passenger compartment. In a vehicle with the lighting package, the cup holder assemblies often include a lighting feature to illuminate an interior of a cup holder. In a vehicle without the lighting package, the lighting feature is removed from the cup holder assemblies.

Accordingly, there is a need for cup holder assemblies of console assemblies capable of being used without the lighting feature package while avoiding a user from noticing the absence of the lighting feature package.

SUMMARY

In accordance with one embodiment, a cup holder assembly for a console assembly of a vehicle is provided. The cup holder assembly includes a cover, a housing, a light source, and a support frame. The cover includes an exterior surface, an opposite interior surface, and an opening extending between the exterior surface and the interior surface. The housing includes an open ended receptacle defined by a floor and at least one sidewall. The at least one sidewall having a slit. The housing is connected to the interior surface of the cover such that the opening of the cover permits access to the open ended receptacle. The support frame is connected to at least one of the cover and the housing. The light source is mounted to the support frame such that the light source is positioned adjacent the slit in the at least one sidewall to illuminate an interior of the receptacle.

In accordance with another embodiment, a vehicle is provided. The vehicle includes a passenger compartment and console assembly. The console assembly includes a cup holder assembly within the passenger compartment. The cup holder assembly includes a cover, a housing, a light source, and a support frame. The cover includes an exterior surface, an opposite interior surface, and an opening extending between the exterior surface and the interior surface. The housing includes an open ended receptacle defined by a floor and at least one sidewall. The at least one sidewall having a slit. The housing is connected to the interior surface of the cover such that the opening of the cover permits access to the open ended receptacle. The support frame is connected to at least one of the cover and the housing. The light source is mounted to the support frame such that the light source is positioned adjacent the slit in the at least one sidewall to illuminate an interior of the receptacle.

In accordance with another embodiment, a method of assembling a cup holder assembly for a console assembly of a vehicle is provided. The method includes connecting an interior surface of a cover to a housing, mounting a light source to a support frame, and connecting the support frame having the light source to at least one of the cover and the housing. The cover includes an exterior surface opposite the interior surface, and an opening extending between the exterior surface and the interior surface. The housing includes an open ended receptacle defined by a floor and at least one sidewall. The at least one sidewall includes a slit. The housing is connected to the interior surface of the cover such that the opening permits access to the open ended receptacle. The support frame having the light source is connected to at least one of the cover and the housing such that the light source is positioned adjacent the slit in the at least one sidewall to illuminate an interior of the receptacle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Figure 1:
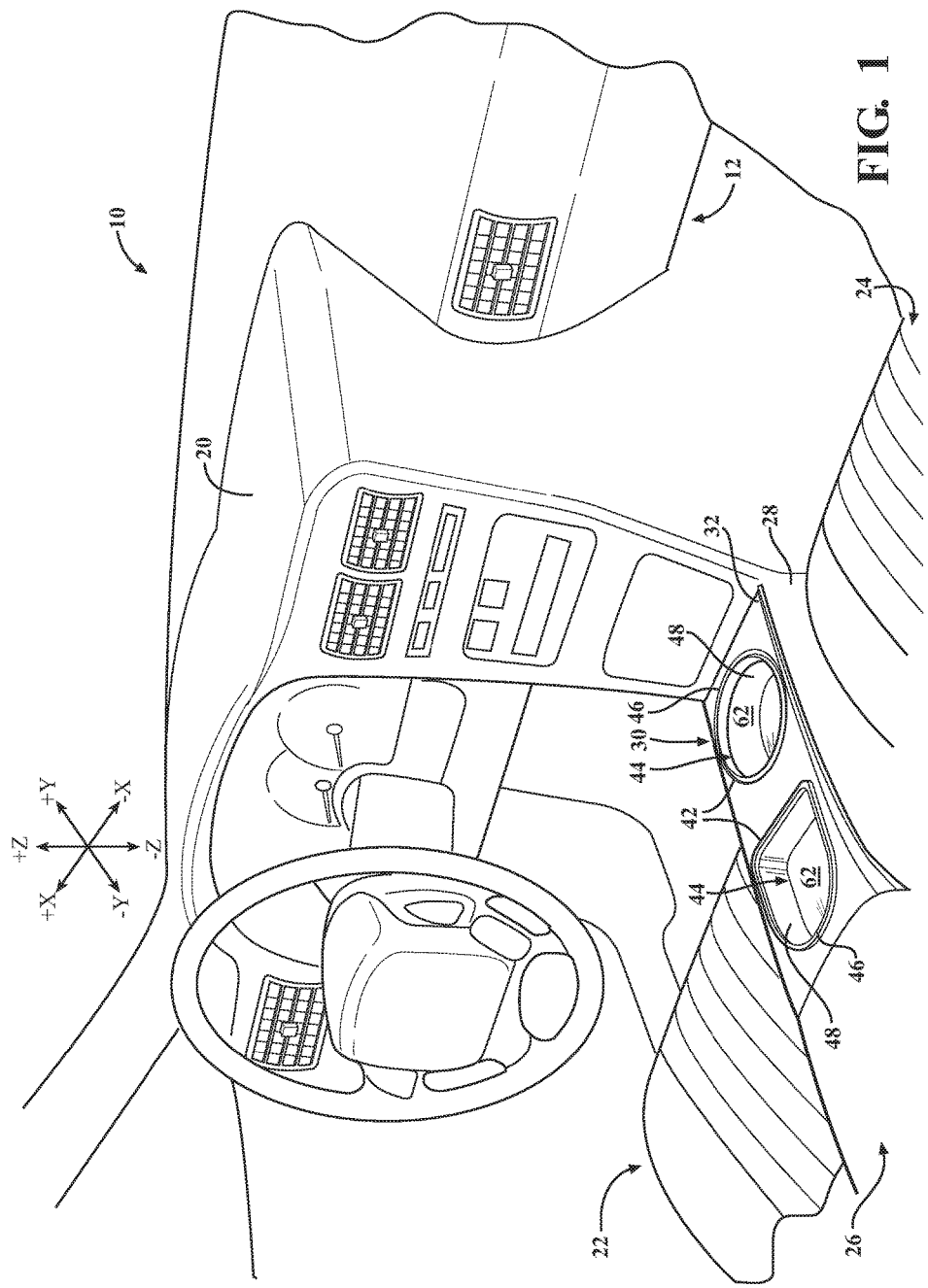
FIG. 1 schematically depicts a partial perspective view of a passenger compartment for a vehicle having a console assembly having a cup holder assembly with a lighting feature, according to one or more embodiments described and illustrated herein.

Vehicles according to the present specification include a passenger compartment having an instrument panel and at least two seats, a driver seat and a front passenger seat. Between the driver seat and the passenger seat, and rearward of the instrument panel is a console assembly. The console assembly extends rearward from the instrument panel in a vehicle longitudinal direction. The console assembly may be mounted in-between the driver seat and the front passenger seat, and immediately rearward of the instrument panel so that a portion the console assembly may be incorporated with the instrument panel.

The console assembly includes a cup holder assembly. The cup holder assembly includes a cover, a housing, a light source, and a support frame. The cover includes an exterior surface, an opposite interior surface, and an opening extending between the exterior surface and the interior surface. The housing includes an open ended receptacle defined by a floor and at least one sidewall. The at least one sidewall includes a slit. The housing is connected to the interior surface of the cover such that the opening of the cover permits access to the open ended receptacle. The support frame is connected to at least one of the cover and the housing. The light source is mounted to the support frame such that the light source is positioned adjacent the slit in the at least one sidewall to illuminate an interior of the receptacle.

In some embodiments, the support frame may include an aperture. The open ended receptacle extends through the aperture upon connection of the support frame to the at least one of the cover and the housing. The support frame may also include a mount that extends outwardly from a lower surface of the support frame. The light source is connected to the mount of the support frame. The mount is positioned on the support frame adjacent the aperture such that upon mounting the light source to the mount, the light source is positioned adjacent the slit provided on the at least one sidewall to illuminate the interior of the receptacle.

In some embodiment, the cover includes a brace that extends outwardly from the interior surface of the cover. The mount includes an opening and a slot in communication with the opening. The light source includes a lens, a body, and a protrusion. The protrusion includes a trunk portion and an arm portion. The trunk portion extends outwardly from the body. The arm portion extends outwardly from the trunk portion. The light source is mounted to the support frame by inserting the lens into the opening and sliding the protrusion into the slot such that the trunk portion is received within the slot and the arm portion is on one side of the mount and the body of the light source is on an opposite side of the mount.

The embodiments disclosed herein may be configured to allow for a cup holder assembly to be used in vehicles with or without a lighting feature package. In vehicles without the lighting feature, the cup holder assembly prevents a user from noticing the absence of the lighting feature. Specifically, in vehicles with the lighting feature, the cup holder assembly may be provided with the light source that is used to illuminate the interior of the receptacle, and in vehicles without the lighting feature, the cup holder assembly may not be provided with the light source. In some embodiments, the cup holder assembly may not be provided with either the support frame or the light source in vehicles without the lighting feature.

As the light source is mounted to the support frame which is below the interior surface of the cover and illuminates the interior of the receptacle through the slit in the at least one sidewall, the appearance of the cup holder assembly without the lighting feature package, that is without the light source, is unnoticeable to a user. As the outwardly appearance of the cup holder assembly is the same with or without the lighting feature, the cup holder assembly can be used in vehicles with and without the lighting feature.

The embodiments disclosed herein may also be configured to facilitate and retain the installation of the light source into the mount of the support frame. Upon connection of the support frame to the at least one of the cover and the housing, the brace contacts the light source to retain the light source in the mount. The contact between the brace and the body of the light source aids in the installation of the protrusion within the slot of the mount. Once the support frame is connected to at least one of the cover and the housing, the contact between the brace and the body of the light source retains the position of the light source within the mount. As such, the light source is retained in a proper position upon connection of the support frame and the at least one of the cover and the housing.

Various embodiments of the cup holder assembly of the console assembly for the passenger compartment of the vehicle will be described in more detail herein.

It should be appreciated that the console assembly may be provided at any suitable position within a vehicle, such as between a pair of front row seats, a pair of second or third row rear seats, etc. The console assembly may be provided with an interior cavity utilized as a storage compartment. The console assembly may be provided within a center console of a vehicle as described above. While the embodiments described herein are described in reference to a console assembly having a cup holder assembly having a receptacle configured to receive an object such as a cup or other beverage container, the embodiments are not limited thereto. For example, in some embodiments, the open ended receptacle of the cup holder assembly may include, without limitation, alternative vehicle accessories such as storage areas, ashtrays, electronic components, HVAC, and/or audio component controls, etc.

In some embodiments, the cup holder assembly is fixedly secured to the console assembly. However, the embodiments are not limited thereto. For example, in some embodiments, the cup holder assembly may be releasably attached to the console assembly for movement between console assemblies positioned between pairs of first row seats, second row seats, and third row seats of a vehicle.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings. Further, the terms "outboard" or "outward" as used herein refers to the relative location of a component with respect to a vehicle centerline. The term "inboard" or "inward" as used herein refers to the relative location of a component with respect to the vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Referring initially to FIG. 1, a partial perspective view of a passenger compartment 12 of a vehicle 10 is depicted. The passenger compartment 12 includes a driver area and a passenger area.

An instrument panel 20 is provided within the passenger compartment 12. The instrument panel 20 generally extends in the vehicle lateral direction and includes, without limitation, an instrument cluster, a radio, and a climate control cluster including a plurality of individual vents. Further, the passenger compartment 12 includes a driver seat 22 and a front passenger seat 24. Located adjacent the driver seat 22 are the controls to the vehicle 10 such as, without limitation, a steering wheel, a gas pedal, and a brake pedal. It should be appreciated that the passenger compartment 12 may include a plurality of passenger seats rearward of the front passenger seat 24 in the vehicle longitudinal direction.

Generally, between the driver seat 22 and the front passenger seat 24 is a console assembly 26. The console assembly 26 generally extends in the vehicle longitudinal direction extending from the instrument panel 20 ending at or slightly beyond a rear surface of the driver seat 22 and the front passenger seat 24. Further, the console assembly 26 generally extends in the vehicle lateral direction an equal distance outwardly from the vehicle centerline, limited in width by the distance between the driver seat 22 and the front passenger seat 24. The console assembly 26 includes a pair of side curtains 28 and a cup holder assembly 30 positioned at least partially between the pair of side curtains 28.

The cup holder assembly 30 may be integrated with the console assembly 26. In some embodiments, the cup holder assembly 30 is integrated with the console assembly 26 and the instrument panel 20. In some other embodiments, the cup holder assembly 30 may be separated from the console assembly 26, the instrument panel 20, or both.

Figure 2:
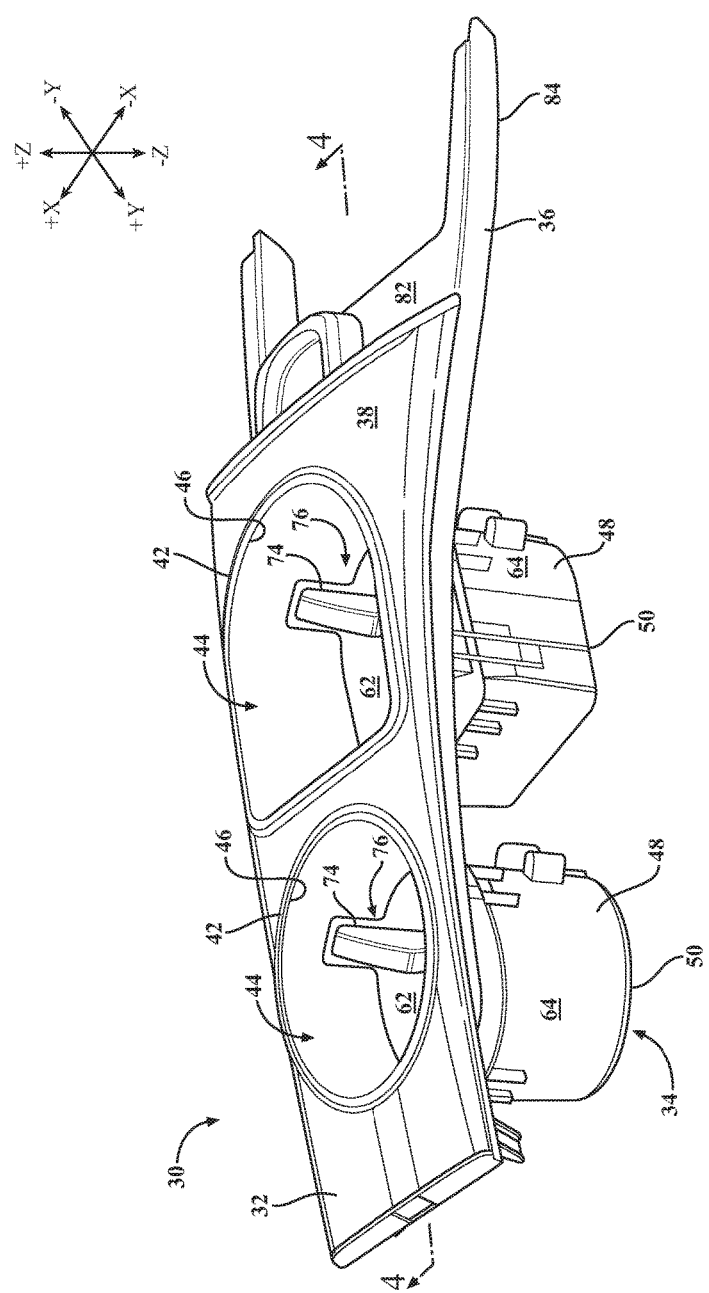
FIG. 2 schematically depicts a front perspective view of the cup holder assembly of the console assembly of FIG. 1 in isolation, according to one or more embodiments described and illustrated herein.
Figure 3:
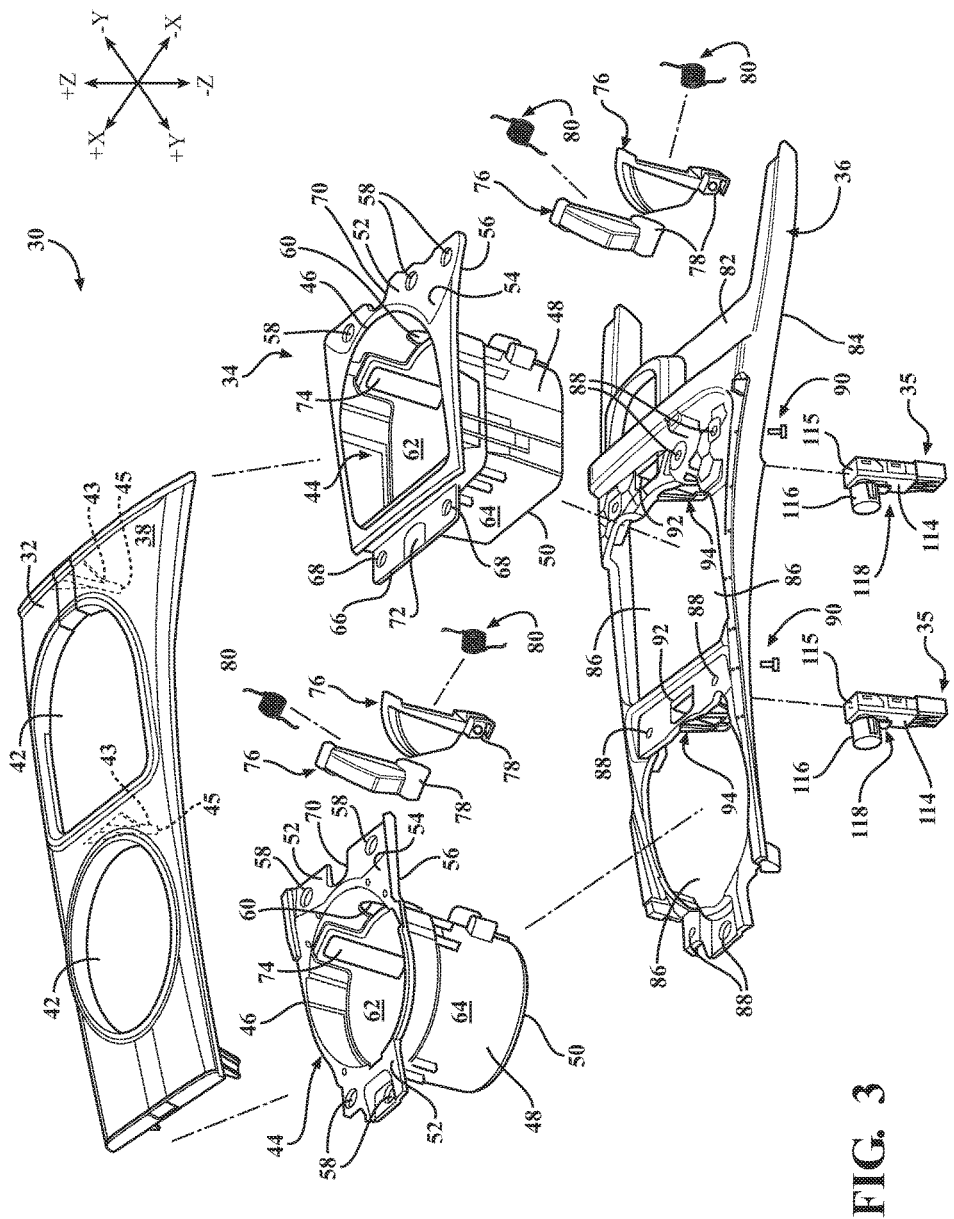
FIG. 3 schematically depicts an exploded view of the cup holder assembly of FIG. 2, according to one or more embodiments described and illustrated herein.
Figure 4:
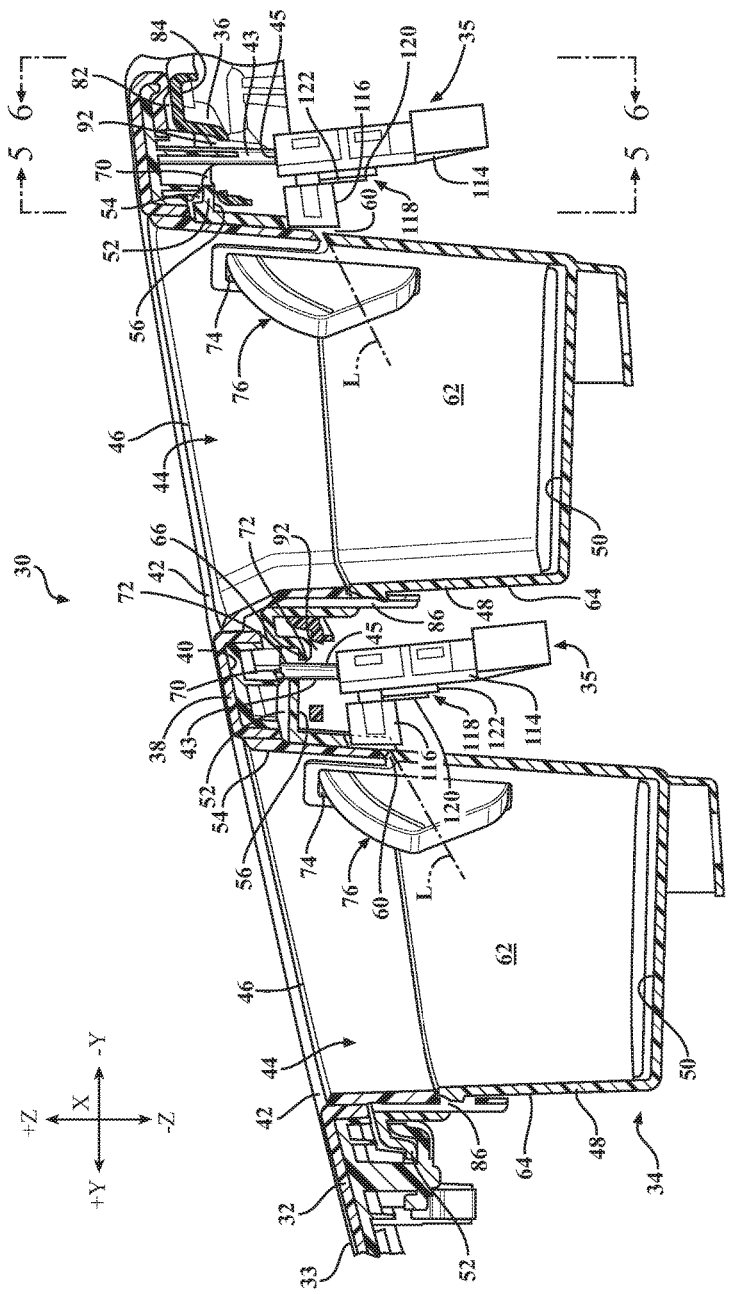
FIG. 4 schematically depicts a cross section of a side view of the cup holder assembly taken along line 4-4 of FIG. 2, according to one or more embodiments described and illustrated herein.

Referring to FIGS. 2, 3, and 4, the cup holder assembly 30 includes a cover 32, a housing 34, at least one light source 35, and a support frame 36. As will be described in greater detail below, the support frame 36 is connected to at least one of the cover 32 and the housing 34, and the housing 34 is connected to the cover 32.

The cover 32 includes an exterior surface 38, an opposite interior surface 40, a pair of openings 42, and a brace 43. The exterior surface 38 is exposed to the passenger compartment 12 of the vehicle 10. The openings 42 extend between the exterior surface 38 and the interior surface 40 of the cover 32. The cover 32 may be provided with a single opening 42 or a pair of openings 42. The brace 43 extends outwardly from the interior surface 40 of the cover 32 downwardly in the vehicle vertical direction. The brace 43 includes a distal end 45 that is spaced apart from the interior surface 40 of the cover 32.

In some embodiments, the cover 32 may include connection posts 47 that extend downwardly in the vehicle vertical direction. The connection posts 47 include internal bores 47' that may include interior threads. In some other embodiments, the cover 32 may include a wrap 33, as shown in FIGS. 4, 5A, 5B, and 6. The wrap 33 covers the exterior surface 38 of the cover 32. The wrap 33 may wrap around the exterior surface 38 of the cover 32 such that a portion of the wrap 33 covers a portion of the interior surface 40 of the cover 32. The wrap 33 may be formed of a soft cover material having an aesthetically appearance, illustratively including but not limited to, leather or vinyl. It is appreciated, of course, that wrap 33 includes openings that correspond to the openings 42 of the cover 32.

Referring to FIGS. 2, 3, and 4, the housing 34 includes a pair of open ended receptacles 44. The open ended receptacles 44 define interior storage spaces therein which receive and retain objects, such as cups or other beverage containers. The open ended receptacles 44 are similarly constructed. Each of the open ended receptacles 44 includes an upper edge 46. The open ended receptacles 44 are defined by the upper edges 46, at least one sidewall 48, and a floor 50. The sidewall 48 extends between the upper edge 46 and the floor 50. The upper edges 46 define open ends of the open ended receptacles 44. The open ends of the open ended receptacles 44 correspond to the openings 42 in the cover 32 to permit access to the open ended receptacles 44.

A flange 52 extends outwardly from the upper edge 46 of the open ended receptacles 44. The flange 52 includes an upper surface 54 and an opposite lower surface 56, and a plurality of bores 58. The plurality of bores 58 extend between the upper surface 54 and the lower surface 56 of the flange 52. The plurality of bores 58 are positioned to correspond to the connection posts 47. As will be described in greater detail below, the upper surface 54 of the flange 52 faces the interior surface 40 of the cover 32.

Each of the open ended receptacles 44 includes a slit 60 formed in the sidewall 48. The slit 60 is formed so as to extend between an inner surface 62 of the sidewall 48 and an opposite outer surface 64 of the sidewall 48. In some embodiments, the slit 60 is provided on a rearward side, in the vehicle longitudinal direction, of the sidewall 48. As shown in FIG. 4, the slit 60 may be angled obliquely with respect to the inner surface 62 and the outer surface 64 of the sidewall 48. Specifically, the slit 60 extends downwardly, in the vehicle vertical direction, as the slit 60 extends forwardly, in the vehicle longitudinal direction, from the outer surface 64 to the inner surface 62.

As shown in FIG. 3, the housing 34 may be formed of a pair of housings 34. In some embodiments, the pair of housings 34 may be integrally formed as a one piece monolithic structure. In some other embodiments, one of the pair of housings 34 includes an attachment flange 66. The attachment flange 66 includes a pair of attachment bores 68 that correspond to the bores 58 on the other of the pair of housings 34.

A cutout 70 may be formed in each of the flanges 52 of the pair of housings 34. An attachment cutout 72 may be formed in the attachment flange 66 of one of the pair of housings 34. The attachment cutout 72 corresponds to the cutout 70 in the flange 52 of the other of the pair of housings 34.

A pair of apertures 74 is formed in the sidewall 48 of the housings 34. The apertures 74 may be provided on the rearward side, in the vehicle longitudinal direction, of the sidewall 48. In some embodiments, the slit 60 is positioned between the pair of apertures 74. Each one of the apertures 74 is configured to receive a retention finger 76. The retention fingers 76 include a shoulder 78 that may contact the outer surface 64 of the sidewall 48 while a remaining portion of the retention finger 76 extends through the apertures 74 to extend at least partially into the interior storage area of the open ended receptacles 44. A biasing member 80 is provided on each of the retention fingers 76 to bias the retention fingers 76 from a retracted position towards an extended position. In the extended position the retention fingers 76 extend farther into the interior storage area of the open ended receptacles 44 than in the retracted position. The biasing of the retention fingers 76 towards the extended position, allows objects positioned within the interior storage area of the open ended receptacles 44 to be retained therein.

Still referring to FIGS. 2, 3, and 4, the support frame 36 includes an upper surface 82, an opposite lower surface 84, and a pair of apertures 86. The pair of apertures 86 extend between the upper surface 82 and the lower surface 84. As will be described in greater detail below, the pair of apertures 86 correspond in shape to the shape of the open ended receptacles 44.

The support frame 36 may include holes 88 that correspond to the bores 58 of the housings 34 and the attachment bores 68 provided on the attachment flange 66. As will be described in greater detail below, the support frame 36 may be connected to at least one of the cover 32 and the housing 34 by fasteners 90 that extend through the holes 88, the bores 58, the attachment bores 68, and into internal bores 47' of the connection posts 47 of the cover 32. In some other embodiments, the support frame 36 and the housings 34 are attached to the cover 32 by heat staking, ultrasonic welding, or adhesives.

The support frame 36 may further include passages 92 that extend between the upper surface 82 and the lower surface 84. The passages 92 are provided on the rearward side, in the vehicle longitudinal direction, of the open ended receptacles 44 to correspond to the location of the slits 60. The passages 92 correspond to the location of the cutouts 70 of the housings 34 and the attachment cutout 72 of the attachment flange 66 such that upon connection of the housings 34 and the support frame 36 to the cover 32 the braces 43 extend through the cutouts 70 and the attachment cutout 72 and through the passages 92 to contact the light sources 35. As will be described in greater detail below, the support frame 36 the brace 43 extend through the cutouts 70, the attachment cutout 72, and the passages 92.

Referring to FIGS. 5A, 5B, 6, and 7, the support frame 36 also includes a pair of mounts 94 that extends outwardly from the lower surface 84 of the support frame 36. The mounts 94 may extend downwardly, in the vehicle vertical direction, from the lower surface 84 of the support frame 36. The mounts 94 may be positioned rearward of the apertures 86, in the vehicle longitudinal direction, so as to be adjacent the slits 60 formed in the sidewall 48 of the housing 34. In some embodiments, the mounts 94 are positioned rearward, in the vehicle longitudinal direction of the slits 60 formed in the sidewall 48 of the housing 34.

The mounts 94 are provided on the lower surface 84 of the support frame 36 below the passages 92. The mounts 94 includes a pair of spaced apart struts 96 that may extend downwardly, in the vehicle vertical direction, from the lower surface 84 of the support frame 36. The struts 96 may be provided adjacent the passages 92 on the support frame 36.

A portion of the struts 96, adjacent the lower surface 84 of the support frame 36, are spaced apart to define an opening 98. The mounts 94 include a traversing wall 100 that extends between the pair of struts 96. The opening 98 is positioned between the lower surface 84 of the support frame 36 and the traversing wall 100. As will be described in greater detail below, the traversing wall 100 includes a first surface 100A and an opposite second surface 100B.

The traversing wall 100 includes a slot 104 that extends downwardly from an upper edge 102. The slot 104 extends between the first surface 100A and the second surface 100B. The slot 104 is defined by a pair of sidewalls 106 and an end wall 108 that extends between the pair of sidewalls 106. The slot 104 is in communication with the opening 98. The slot 104 is formed to be narrower than the opening 98.

In some embodiments, the mounts 94 include reinforcement ribs 110 to reinforce the struts 96. The struts 96 include an outer edge 112 that is opposite the opening 98. Each of the reinforcement ribs 110 extend between the outer side 112 of the struts 96 and the lower surface 84 of the support frame 36.

Referring to FIGS. 4, 5A, 5B, 6, and 7, light sources 35 include a body 114, a lens 116, and a protrusion 118. The body 114 is connected to a wire harness (not shown) to power the light sources 35. The body 114 includes a contact portion 115. The contact portion 115 may be provided as the uppermost portion of the body 114 in the vehicle vertical direction. The lens 116 extends outwardly from the body 114.

The protrusion 118 includes a trunk portion 120 and an arm portion 122. The trunk portion 120 extends outwardly from the body 114. In some embodiments, the trunk portion 120 extends in a longitudinal direction of the body 114. The arm portion 122 extends outwardly from the trunk portion 120. The arm portion 122 may extend generally normal from an end of the truck portion 120, such that the protrusions 118 has a generally T-shaped cross-section. The arm portion 122 includes a distal surface 124 and an opposite proximate surface 126. The proximate surface 126 is connected to the end of the trunk portion 120 and faces the body 114. The light sources 35 may be, without limitation, LED modules or light bulbs.

Referring to FIGS. 3, 4, 5A, 5B, 6, and 7, the connection of the cover 32, the housing 34, the light sources 35, and the support frame 36, will now be discussed in detail. The housings 34 are connected to the interior surface 40 of the cover 32. In some embodiments, the housings 34 are connected to the interior surface 40 of the cover 32 such that the bores 58 of the flanges 52 and the attachment bores 68 of the attachment flange 66 correspond to the internal bores 47' of the connection posts 47. In some other embodiments, the housings 34 are connected to the interior surface 40 of the cover 32 by arranging the connection posts 47 to extend through the bores 58 of the flanges 52 and the attachment bores 68 of the attachment flange 66. In some other embodiments, the housings 34 are connected to the interior surface 40 of the cover 32 by additional fasteners, adhesives, heat stakes (not shown).

Figure 5A:
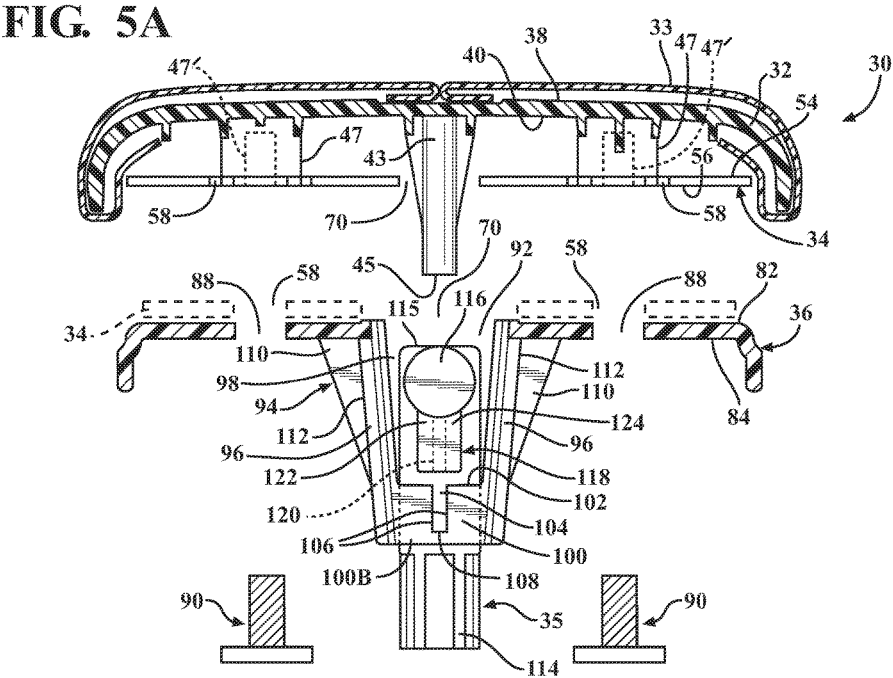
FIG. 5A schematically depicts a cross section of a front view of the cup holder assembly taken along line 5-5 of FIG. 4 with a light source in a partially installed state, according to one or more embodiments described and illustrated herein.

As shown in FIG. 5A, the light sources 35 is connected to the support frame 36 prior to the support frame 36 being connected to the cover 32. Specifically, the light sources 35 are mounted within the mounts 94 prior to the connection of the support frame 36 to the cover 32. The light source 35 is mounted within the mounts 94 by inserting the lens 116 of the light source 35 through the opening 98 formed in the mounts 94. The trunk portion 120 is aligned with the slot 104 upon insertion of the lens 116 of the light source 35 into the opening 98. In some embodiments, the light sources 35 are at least partially mounted within the mounts 94 such that the lens 116 extends through the opening 98 and at least a portion of the trunk portion 120 is inserted within the slot 104. After the light sources 35 have been at least partially mounted to mounts 94, the support frame 36 is connected to at least one of the cover 32 and the housing 34.

In some other embodiments, the housing 34 is connected to the support frame 36 prior to connection of the support frame 36 to the cover 32. As shown in FIG. 5A, the housing 34 (shown in ghost) is connected to the support frame 36 by inserting the open ended receptacles 44 into the apertures 86 of the support frame 36. As the flanges 52 and the attachment flange 66 extend outwardly from the upper edge 46 of the open ended receptacles 44, the housings 34 may be retained within the support frame 36 by the contact of the lower surfaces 56 of the flanges 52 against the upper surface 82 of the support frame 36. Upon connection of the housing 34 to the support frame 36 and the mounting of the light sources 35 to the support frame 36, the support frame 36 is connected to the cover 32.

Figure 5B:
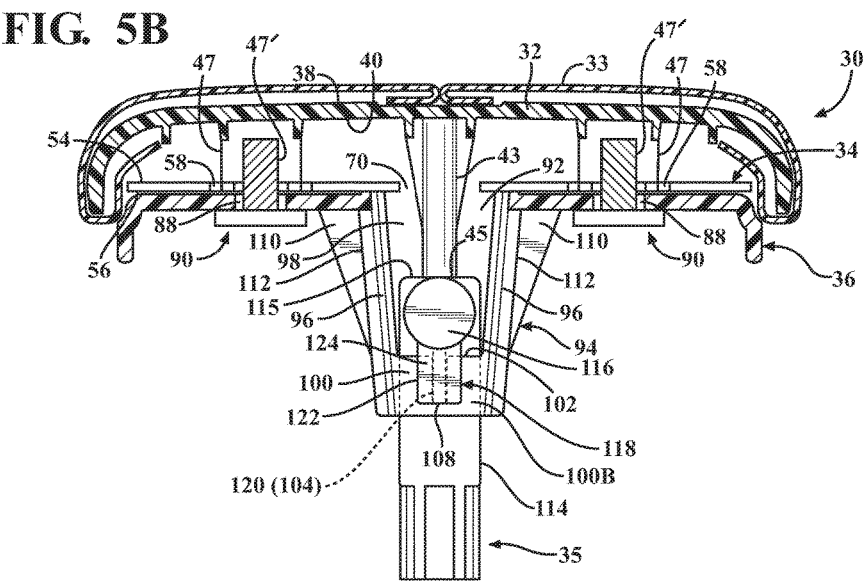
FIG. 5B schematically depicts a cross section of a front view of the cup holder assembly taken along line 5-5 of FIG. 4 with the light source in an installed state, according to one or more embodiments described and illustrated herein.
Figure 6:
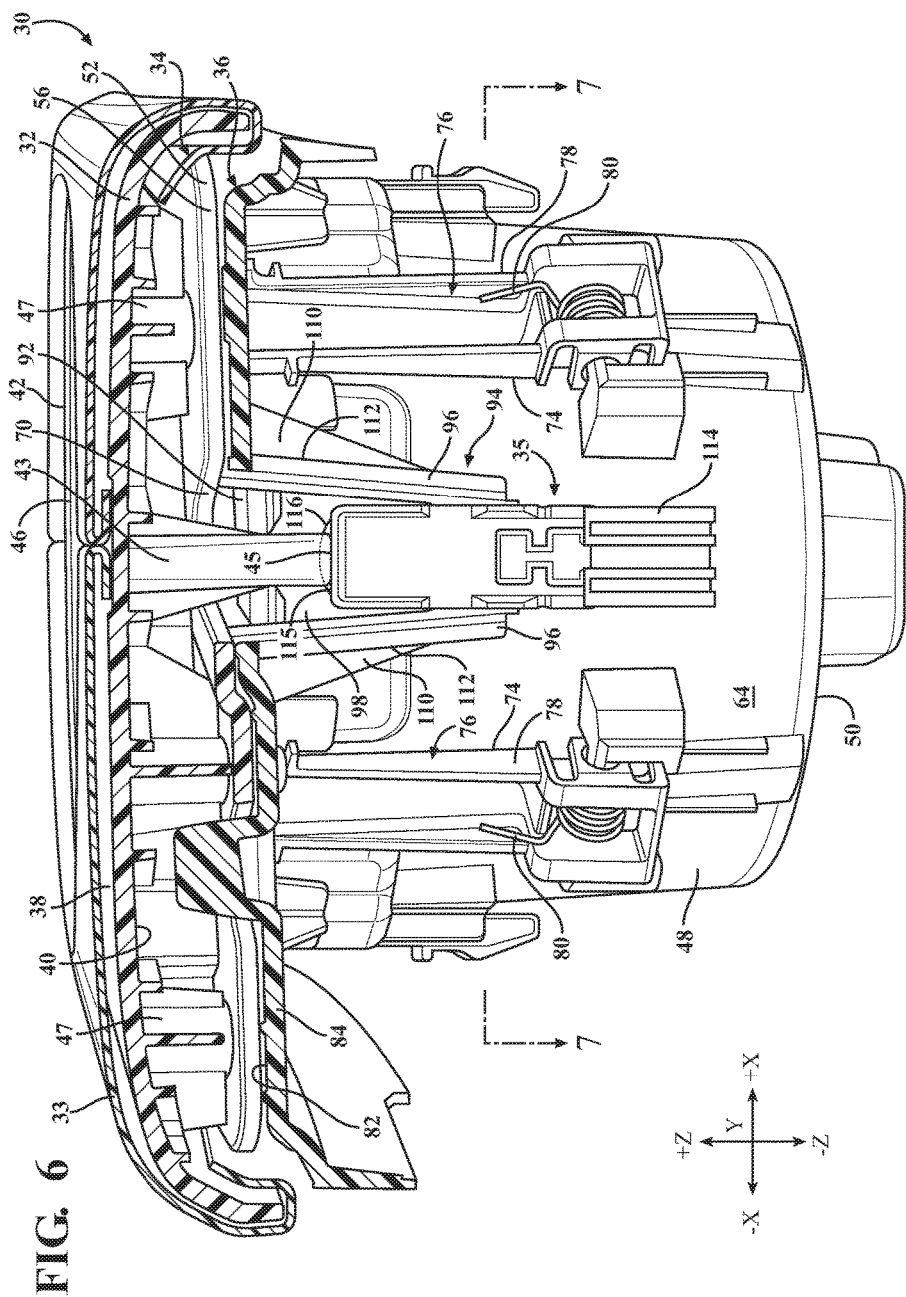
FIG. 6 schematically depicts a cross section of a rear view of the cup holder assembly of FIG. 4 taken along line 6-6, according to one or more embodiments described and illustrated herein.

As shown in FIG. 5B, the support frame 36, having the light sources 35 at least partially mounted to the mounts 94, is connected to the at least one of the cover 32 and the housing 34. Specifically, the holes 88 of the support frame 36 are arranged to correspond to the bores 58, the attachment bores 68, and the internal bores 47' of the connection posts 47 of the cover 32. Fasteners 90 secure the support frame 36 to the cover 32 and the housing 34, with the housing 34 being positioned between the upper surface 82 of the support frame 36 and the interior surface 40 of the cover 32. Specifically, fasteners 90 extend through the holes 88 of the support frame 36, the bores 58, the attachment bores 68, and the internal bores 47' of the connection posts 47. The connection of the fasteners 90 to the internal bores 47' of the connection posts 47 connects the cover 32, the housing 34, and the support frame 36.

The connection of the cover 32, the housing 34, and the support frame 36, also aligns the brace 43 to extend through the cutouts 70, the attachment cutout 72, and the passages 92 of the support frame 36. The connection of the cover 32, the housing 34, and the support frame 36, permits the brace 43 to extend through the housing 34 and the support frame 36 such that the distal end 45 of the brace 43 contacts the contact portion 115 of the body 114 to properly mount the light source 35 within the mounts 94. Specifically, the connection of the cover 32, the housing 34, and the support frame 36 displaces the brace 43 with respect to the support frame 36 such that the distal end 45 contacts and depresses the contact portion 115 of the body to properly insert the protrusion 118 within the slot 104.

Figure 7:
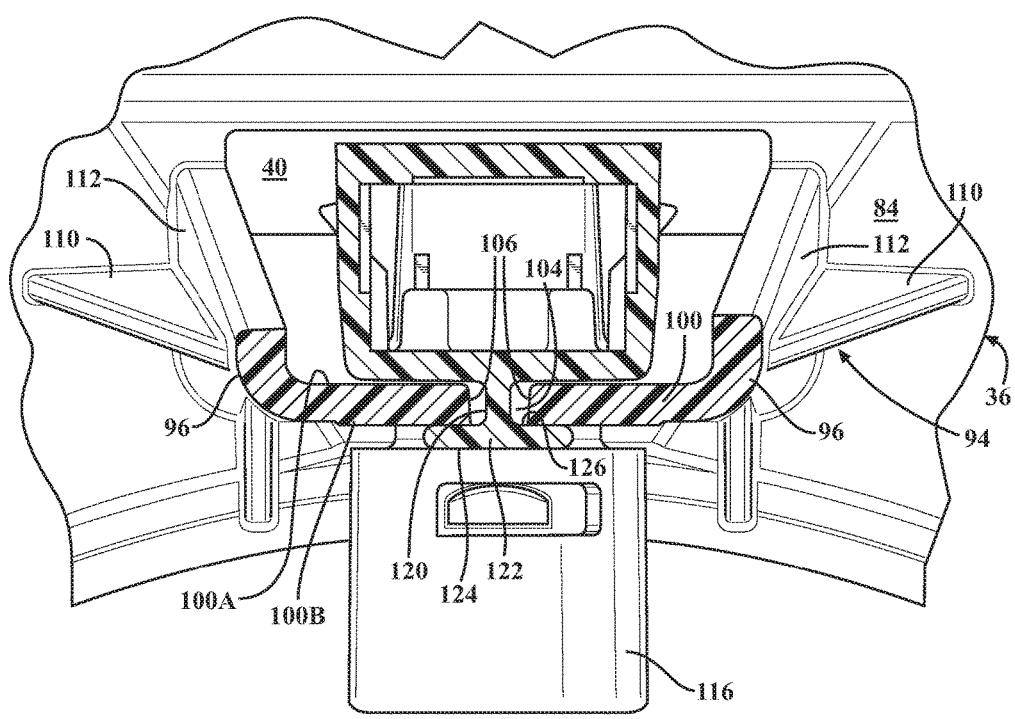
FIG. 7 schematically depicts a cross section of a bottom view of the cup holder assembly of FIG. 6 taken along line 7-7, according to one or more embodiments described and illustrated herein.

With reference to FIGS. 5A, 5B, and 7, the insertion of the protrusion 118 within the slot 104 will be described in detail. As shown in FIG. 5A, upon the insertion of the lens 116 into the opening 98, the trunk portion 120 is aligned with the slot 104, specifically, the trunk portion 120 is aligned between the sidewalls 106 of the slot 104. As shown in FIG. 5B, after the connection of the cover 32, the housing 34, and the support frame 36, the distal end 45 of the brace 43 contacts the contact portion 115 to insert the trunk portion 120 into the slot 104 such that a portion of the trunk portion 120 extends beyond the upper edge 102 of the traversing wall 100. Upon installation of the light source 35 into the mount 94, the trunk portion 120 contacts the end wall 108 of the slot 104.

Referring to FIG. 7, upon displacement of the light source 35 with respect to the mount 94, due to the contact between the distal end 45 of the brace 43 and the contact portion 115, the trunk portion 120 is inserted into the slot 104. The contact between the distal end 45 of the brace 43 and the contact portion 115 of the body 114 of the light source 35 and the contact of the trunk portion 120 and the end wall 108 retains the position of the light source 35, with respect to the mount 94, in the vehicle vertical direction.

As the arm portion 122 is formed to be wider than a width of the slot 104, the proximate surface 126 of the arm portion 122 may extend beyond the slot 104. In some embodiments, upon mounting of the light source 35 to the mount 94, the proximate surface 126 contacts the second surface 100B of the traversing wall 100 and the first surface 100A of the traversing wall 100 contacts the body 114 of the light source 35. In some embodiments, the positioning of the arm portion 122 on the second surface 100B of the traversing wall 100 and the body 114 of the light source 35 on the first surface 100A of the traversing wall 100 retains the position of the light source 35, with respect to the mount 94, in one of the vehicle lateral direction and the vehicle longitudinal direction. The positioning of a portion of the trunk portion 120 between the sidewalls 106 of the slot 104 retains the position of the light source 35, with respect to the mount 94, in the other of the vehicle lateral direction and the vehicle longitudinal direction.

Referring to FIG. 4, the mount 94 is provided adjacent the outer surface 64 of the housing 34, upon connection of the housing 34 and the support frame 36, such that the lens 116 faces the slit 60. Upon activation of the light source 35, the lens 116 emits light L that extends through the slit 60 from the outside of the open ended receptacle 44 and into the interior storage area of the open ended receptacle 44. As the slit 60 is angled obliquely with respect to the sidewall 48, specifically, the slit 60 extends downwardly, in the vehicle vertical direction, as the slit 60 extends forwardly, in the vehicle longitudinal direction, from the outer surface 64 to the inner surface 62, the light L emitted from the lens 116 extends downwardly, in the vehicle vertical direction and forwardly, in the vehicle longitudinal direction in order to illuminate the interior storage area of the open ended receptacle 44. In some embodiments, the slit 60 is provided on a rearward side, in the vehicle longitudinal direction, of the open ended receptacle 44 such that the lens 116, and the light L emitted therefrom, does not shine directly towards the driver seat 22.

In some embodiments, the cover 32 and the housing 34 may be integrally formed as a one piece monolithic structure. Specifically, the cover 32 and the housing 34 may be integrally molded as a one piece monolithic structure.

The above described console assemblies provide cup holder assemblies that are configured to be used in vehicles with or without lighting features. As the outwardly appearance of the cup holder assembly is the same with or without the lighting feature, the cup holder assembly can be used in vehicles with and without the lighting feature. The above described console assemblies provide cup holder assemblies that are configured to facilitate and retain the installation of the light source into the mount of the support frame. Upon connection of the support frame to the at least one of the cover and the housing, the brace contacts the light source to retain the proper position of the light source in the mount.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cup holder assembly for a console assembly of a vehicle, the cup holder assembly comprising:
    a cover having an exterior surface, an opposite interior surface, and an opening extending between the exterior surface and the interior surface;
    a housing having an open ended receptacle defined by a floor and at least one sidewall, the at least one sidewall having a slit, the housing is connected to the interior surface of the cover such that the opening permits access to the open ended receptacle;
    a light source; and a support frame connected to at least one of the cover and the housing, the light source is mounted to the support frame such that the light source is positioned adjacent the slit in the at least one sidewall to illuminate an interior of the receptacle.

2. The cup holder assembly of claim 1, wherein the light source is an LED module.

3. The cup holder assembly of claim 1, wherein the support frame includes an aperture, the receptacle extends through the aperture upon connection of the support frame to the at least one of the cover and the housing.

4. The cup holder assembly of claim 3, wherein the housing includes a pair of open ended receptacles, each of the open ended receptacles are defined by a floor and at least one sidewall having a slit, wherein a pair of light sources are connected to the support frame such that one of the pair of light sources is positioned adjacent to each slit in the at least one sidewall of the pair of open ended receptacles to illuminate the interior of each of the pair of open ended receptacles.

5. The cup holder assembly of claim 1, wherein the support frame includes an upper surface and a lower surface, and
wherein a mount extends outwardly from the lower surface of the support frame, the light source is connected to the mount of the support frame.

6. The cup holder assembly of claim 5, wherein a brace extends outwardly from the interior surface of the cover such that upon connection of the support frame to the at least one of the cover and the housing the brace contacts the light source to retain the light source in the mount.

7. The cup holder assembly of claim 6, wherein the mount includes an opening and a slot in communication with the opening, and
wherein the light source includes a lens, a body, and a protrusion, the protrusion having a trunk portion and an arm portion, the trunk portion extends outwardly from the body, and the arm portion extends outwardly from the trunk portion, the light source is mounted to the support frame by inserting the lens into the opening and sliding the protrusion into the slot such that the trunk portion is received within the slot and the arm portion is on one side of the mount and the body of the light source is on an opposite side of the mount.

8. The cup holder assembly of claim 7, wherein the brace contacts the body of the light source to retain the protrusion within the slot upon connection of the support frame to the at least one of the cover and the housing.

9. A vehicle comprising:
a passenger compartment;
a console assembly having a cup holder assembly within the passenger compartment;
the cup holder assembly comprising:
a cover having an exterior surface, an opposite interior surface, and an opening extending between the exterior surface and the interior surface;
a housing having an open ended receptacle defined by a floor and at least one sidewall, the at least one sidewall having a slit, the housing is connected to the interior surface of the cover such that the opening permits access to the open ended receptacle;
a light source; and
a support frame connected to at least one of the cover and the housing, the light source is mounted to the support frame such that the light source is positioned adjacent the slit in the at least one sidewall to illuminate an interior of the receptacle.

10. The vehicle of claim 9, wherein the light source is an LED module.

11. The vehicle of claim 10, wherein the support frame includes an aperture, the receptacle extends through the aperture upon connection of the support frame to the at least one of the cover and the housing.

12. The vehicle of claim 11, wherein the housing includes a pair of open ended receptacles, each of the open ended receptacles are defined by a floor and at least one sidewall having a slit, wherein a pair of light sources are connected to the support frame such that one of the pair of light sources is positioned adjacent to each slit in the at least one sidewall of the pair of open ended receptacles to illuminate the interior of each of the pair of open ended receptacles.

13. The vehicle of claim 12, wherein the support frame includes an upper surface and a lower surface, and
wherein a mount extends outwardly from the lower surface of the support frame, the light source is connected to the mount of the support frame.

14. The vehicle of claim 13, wherein a brace extends outwardly from the interior surface of the cover such that upon connection of the support frame to the at least one of the cover and the housing the brace contacts the light source to retain the light source in the mount.

15. The vehicle of claim 14, wherein the mount includes an opening and a slot in communication with the opening, and
wherein the light source includes a lens, a body, and a protrusion, the protrusion having a trunk portion and an arm portion, the trunk portion extends outwardly from the body, and the arm portion extends outwardly from the trunk portion, the light source is mounted to the support frame by inserting the lens into the opening and sliding the protrusion into the slot such that the trunk portion is received within the slot and the arm portion is on one side of the mount and the body of the light source is on an opposite side of the mount.

16. The vehicle of claim 15, wherein the brace contacts the body of the light source to retain the protrusion within the slot upon connection of the support frame to the at least one of the cover and the housing.

17. A method of assembling a cup holder assembly for a console assembly of a vehicle, the method comprising:
connecting an interior surface of a cover to a housing, the cover having an exterior surface opposite the interior surface, and an opening extending between the exterior surface and the interior surface, the housing having an open ended receptacle defined by a floor and at least one sidewall, the at least one sidewall having a slit, the housing is connected to the interior surface of the cover such that the opening permits access to the open ended receptacle; a
mounting a light source to a support frame; and
connecting the support frame having the light source to at least one of the cover and the housing such that the light source is positioned adjacent the slit in the at least one sidewall to illuminate an interior of the receptacle.

18. The method of claim 17, wherein the support frame includes an upper surface and a lower surface, and
wherein a mount extends outwardly from the lower surface of the support frame, the light source is connected to the mount of the support frame.

19. The method of claim 18, wherein a brace extends outwardly from the interior surface of the cover such that upon connection of the support frame to the at least one of the cover and the housing the brace contacts the light source to retain the light source in the mount.

20. The method of claim 19, wherein the mount includes an opening and a slot in communication with the opening,
wherein the light source includes a lens, a body, and a protrusion, the protrusion having a trunk portion and an arm portion, the trunk portion extends outwardly from the body, and the arm portion extends outwardly from the trunk portion, the light source is connected to the support frame by inserting the lens into the opening and sliding the protrusion into the slot such that the trunk portion is received within the slot and the arm portion is on one side of the mount and the body of the light source is on an opposite side of the mount, and wherein the brace contacts the body of the light source to retain the protrusion within the slot upon connection of the support frame to the at least one of the cover and the housing.

\* \* \* \* \*